United States Patent [19]

Vykukal

[11] Patent Number: 4,598,427
[45] Date of Patent: Jul. 8, 1986

[54] ELBOW AND KNEE JOINT FOR HARD SPACE SUITS

[75] Inventor: Hubert C. Vykukal, Los Altos, Calif.

[73] Assignee: The United States of America as represented by the Administrator, National Aeronautics and Space Administration, Washington, D.C.

[21] Appl. No.: 684,190

[22] Filed: Dec. 20, 1984

[51] Int. Cl.⁴ .................. A62B 17/00; F16L 11/18
[52] U.S. Cl. .................................. 2/2.1 A; 414/7; 285/168; 138/120
[58] Field of Search .................. 2/2.1 A, 2.1 R; 128/202.11; 414/1, 5, 7, 8; 285/168, 179, 181, 182, 184, 227, 235, 177, 11, 263, 264, 261, 166; 3/12, 12.1-12.8; 138/120, 155

[56] References Cited

U.S. PATENT DOCUMENTS

| | | | |
|---|---|---|---|
| 1,349,060 | 8/1920 | Gall et al. | 2/2.1 R X |
| 1,383,322 | 7/1921 | Marr | 2/2.1 R X |
| 3,242,499 | 3/1966 | Fonda-Bonardi | 2/2.1 R |
| 3,443,758 | 5/1969 | Kopp et al. | 285/168 X |
| 3,754,779 | 8/1973 | Peress | 2/2.1 R X |
| 3,759,550 | 9/1973 | Peress | 2/2.1 R X |
| 4,369,814 | 1/1983 | Humphrey | 2/2.1 R X |

OTHER PUBLICATIONS

High-Pressure Protective Systems Technology, Aerospace Div. of ASME, 9th Intersociety Conf. on Env. Sys. San Fran. Calif., Jul. 16-19, 1979.

Primary Examiner—Werner H. Schroeder
Assistant Examiner—Andrew M. Falik
Attorney, Agent, or Firm—Darrell G. Brekke; John R. Manning; Robert D. Marchant

[57] ABSTRACT

An elbow or knee joint for a hard space suit or similar usage is formed of three serially-connected rigid sections which have truncated spherical configurations. The ends of each section form solid geometric angles, and the sections are interconnected by hermetically-sealed ball bearings. The outer two sections are fixed together for rotation in a direction opposite to rotation of the center section. A preferred means to make the outer sections track each other in rotation comprises a rotatable continuous bead chain which engages sockets circumferentially spaced on the facing sides of the outer races of the bearings. The joint has a single pivot point and the bearing axes are always contained in a single plane for any articulation of the joint. Thus flexure of the joint simulates the coplanar flexure of the knee or elbow and is not susceptible to lockup.

29 Claims, 12 Drawing Figures

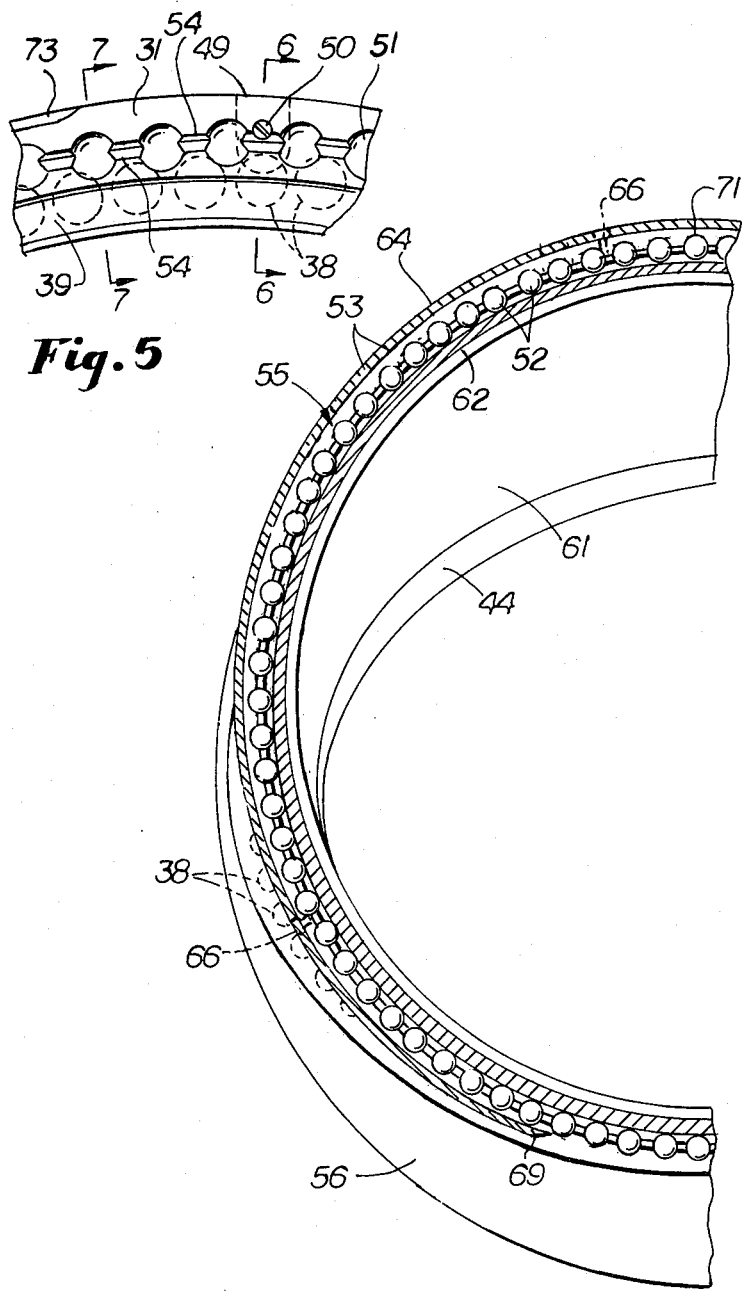

ELBOW AND KNEE JOINT FOR HARD SPACE SUITS

DESCRIPTION

ORIGIN OF THE INVENTION

The invention described herein was made by an employee of the United States Government and may be manufactured and used by and for the Government for governmental purposes without the payment of any royalties thereon or therefor.

BACKGROUND OF THE INVENTION

1. Field of the Invention

This invention relates to hard space suit joints, especially for the elbow and knee. It may also be used on diving suits, manipulator arms, user-occupied arms for penetrating boxes such as autoclaves, high vacuum boxes for integrated circuit work and the like, and to cover and isolate articulated torque drives which require protection from hostile environments. The joint has an outer covering of a relatively rigid material comprising three serially-connected sections wherein the outer two sections rotate in unison in a direction opposite to the inner section so that the joint flexes as does a normal elbow or knee joint.

2. Description of the Prior Art

U.S. Pat. No. 3,405,406 (and particularly FIGS. 6-11) shows an elbow or knee joint that comprises two rotatable sections. The present invention provides a joint which permits a smaller envelope size.

U.S. Pat. No. 4,091,464 (particularly FIGS. 10, 11, 16 and 17) also reveals elbow and knee joints that may be used in a pressurized suit. The present invention provides much greater flexibility of movement at the joint and obviates the need for pleated or rolling convolute diagrams. U.S. Pat. No. 3,421,158 also discloses a rolling convolute variety elbow joint. The joint has five nesting sections that are sealed by means of a fabric that must be rolled back and forth when the joint is extended and flexed. The joint has three pivot points whereas the present invention only has one (as does the human elbow).

U.S. Pat. No. 3,712,481 discloses a snakelike actuator for use on submarines and so forth that is motor actuated, whereas the present invention requires no motors and is actuated by body movement of the wearer. The snakelike actuator arm comprises a continuous bellows outer layer which provides a hermetic seal plus two inner layers, each of which comprises alternate cylindrical wedges and bellows. In a second embodiment the actuator arm comprises three bellows layers plus a layer of rotatable wedges. In each instance the arm is moved by means of torque motors coupled to the layers.

The paper "High-Pressure Protective System Technology" by Hubert C. Vykukal and Bruce W. Webbon, ASME Publication 79-ENAs-15, 1979, includes a photograph (FIG. 6) of a mockup of a portion of a spacesuit. The mockup comprises a torso section, a single arm and glove, and a partial head cover. The elbow joint comprises three independently rotatably sections. The included angle between the ends of the center section is larger than the included angles associated with the end sections. Inasmuch as the joint was prone to lockup it was abandoned and not employed in an actual pressurized suit. Lockup is a condition whereby the joint will not permit desired planar motion without additional programming (or possibly not at all).

OBJECT OF THE INVENTION

The present invention has for its principal object to provide an elbow or knee joint for use in space suits and other environments heretofore mentioned. It consists of hard, rigid plastic or metal sections configured in truncated spherical shapes.

The joint comprises three serially-connected sections that are interconnected by means of ball bearings. The ball bearings permit one section to rotate with respect to an adjacent section. Each section has first and second ends with circular openings which admit the limb of the wearer. The ends of each section are contained in planes which are nonparallel. The two end sections have identical included angles between the planes of their ends, whereas the midsection has an angle between the planes of its ends that is twice as large. The two end sections are locked together. The joint may assume a straight line or bend as does the human elbow or knee. When there is motion of an elbow or knee within the mechanical joint the three sections of the joint are rotated. The end sections rotate in unison in a direction opposite to the rotation of the center section so that the mechanical joint flexes and follows the articulation of the elbow or knee. Accordingly, it is a further object of the present invention to provide extreme flexibility at the joint so that the wearer may have comparatively unimpeded movement of the elbow and the knee.

Another object of the invention is to prevent joint lockup, that is, to prevent the end sections of the joint from taking undesired nonplanar random paths which are contrary to the planar path desired by the joint wearer.

Another object of the invention is to improve joint mobility. Joints made in accordance with the invention have a single pivot point as do the natural elbow or knee joint.

A feature of the invention is the provision of sealing means that insures that the space suit is airtight in all positions of movement of the joint. Hermetic sealing is accomplished by means of wiper seals.

Still another feature of the invention is the fact that the parts of the joint may be readily assembled and dissembled by use of wires or cables fitting in mating grooves in the parts. The cables may be inserted and removed through slots which are readily accessible to the user.

SUMMARY OF THE INVENTION

The foregoing and other objects and advantages of the invention are achieved through the use of three serially-connected truncated spherical sections which may rotate relative to each other through ball bearings, or the like. The outer sections are effectively tied together so that they rotate in synchronism in a direction opposite to the direction of rotation of the center section. The synchronism tying is achieved by means of a bead chain loop which fits in a groove around the outer portion of the medial section and is received in sockets formed in facing surfaces of the outer races of the bearings, which outer races are fixed to the outer sections. The three sections each have an axis which always remains in an imaginary plane bifurcating the joint for any flexure of the joint. Thus, the joint has one, not two, pivot points, and the ends of the joint are not suject to

IN THE DRAWINGS

FIG. 4 is an enlarged sectional view taken substantially along the line 4—4 of FIG. 2.

FIG. 5 is a side elevational view of a portion of bearing 102 revealing the depressions in the outer race for accepting the bead chain.

DESCRIPTION OF PREFERRED EMBODIMENT

Figure 11:
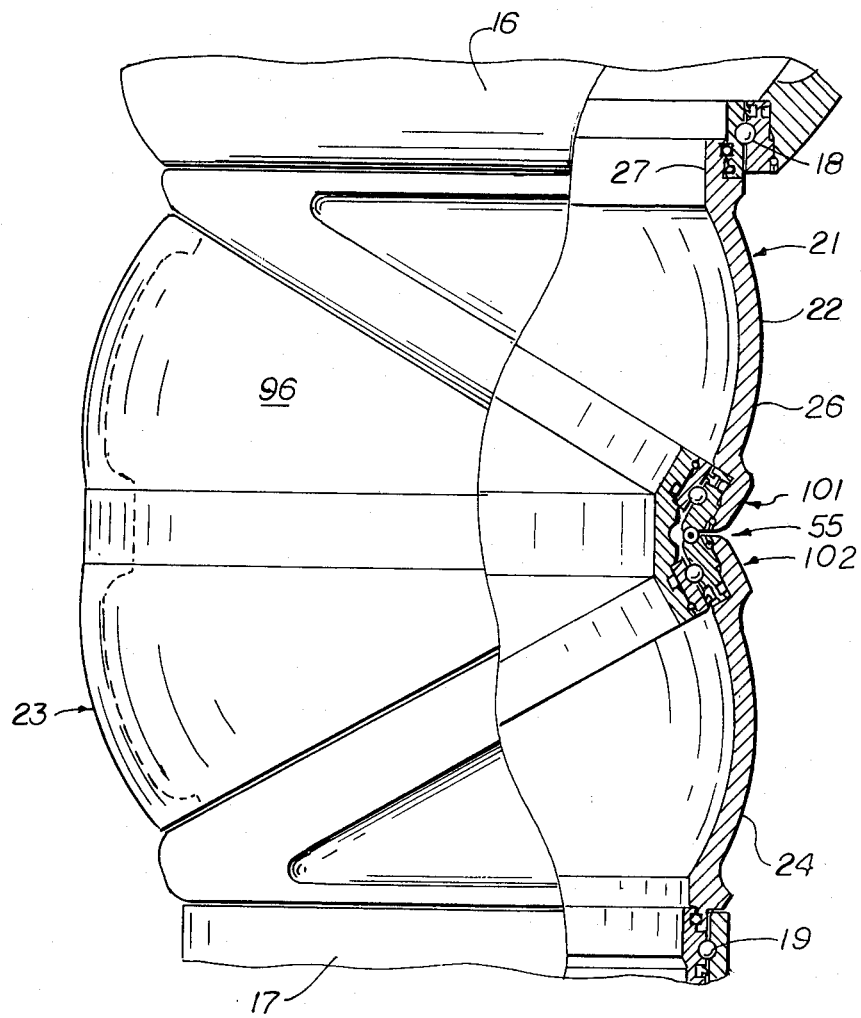
FIG. 11 is a front elevational view of a portion of an arm of a space suit in which the present invention is installed, partially broken away in section.

The joint 21 herein illustrated and described may be used either for an elbow or a knee, the difference being merely a matter of dimensions. As hereinafter described, the joint 21 will be considered used in an elbow joint. Thus, as best shown in FIGS. 1 and 11, the joint 21 consists of a proximal section 22, which is closest to the torso and which is connected to the upper arm 16 of the space suit, an intermediate section 23, and a distal section 24 which is connected to the forearm 17 of the space suit.

Figure 1:
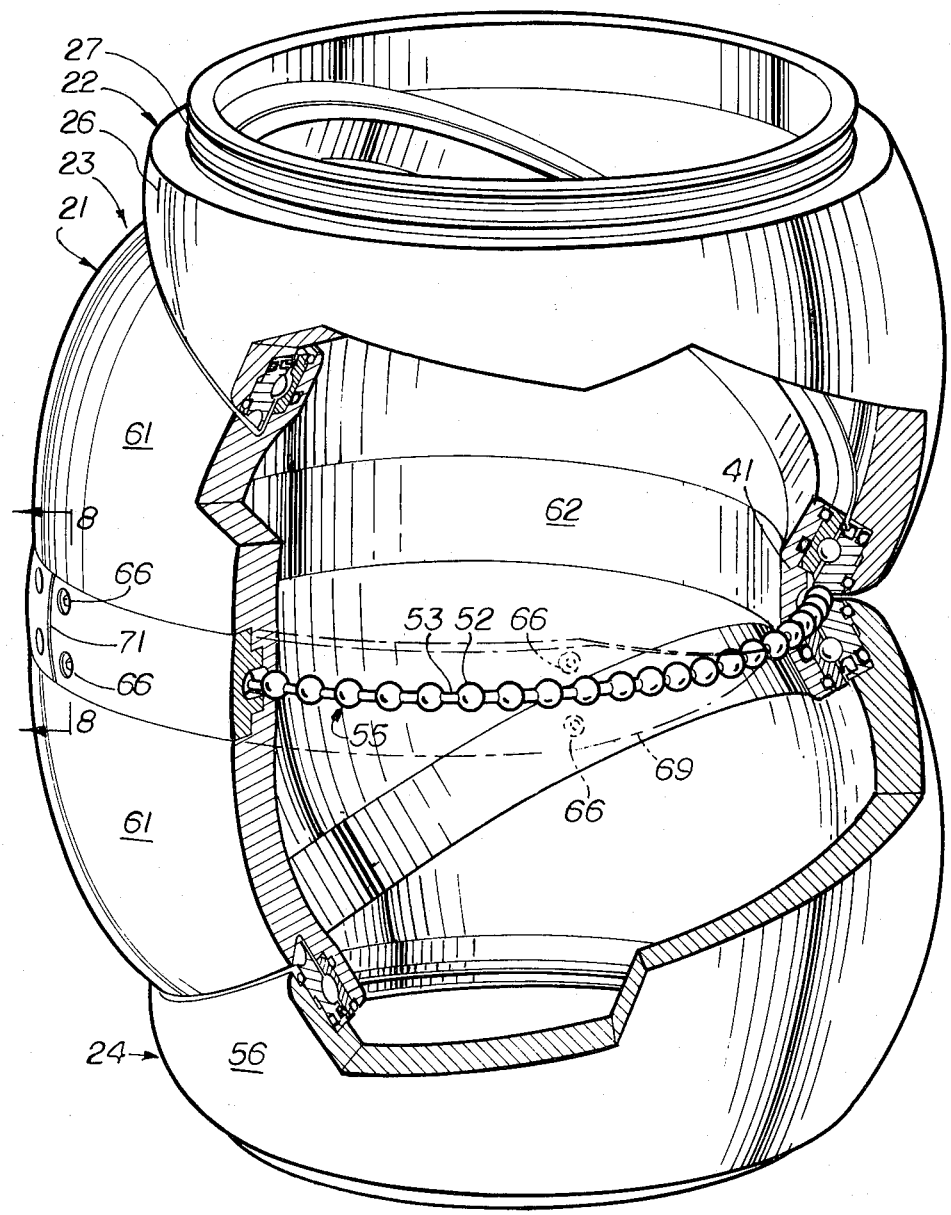
FIG. 1 is a perspective view partly broken away in section to reveal details of the construction of a joint in accordance with the present invention, the joint being fully extended.
Figure 2:
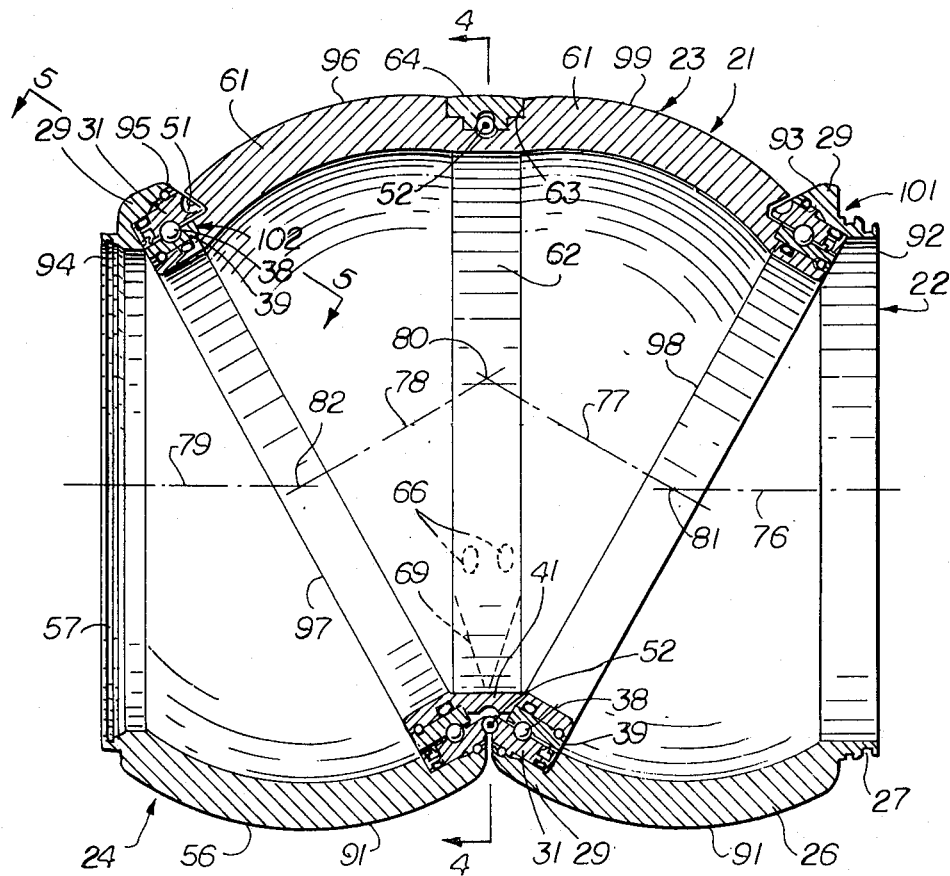
FIG. 2 is a vertical midsectional view through the joint of FIG. 1.
Figure 2A:
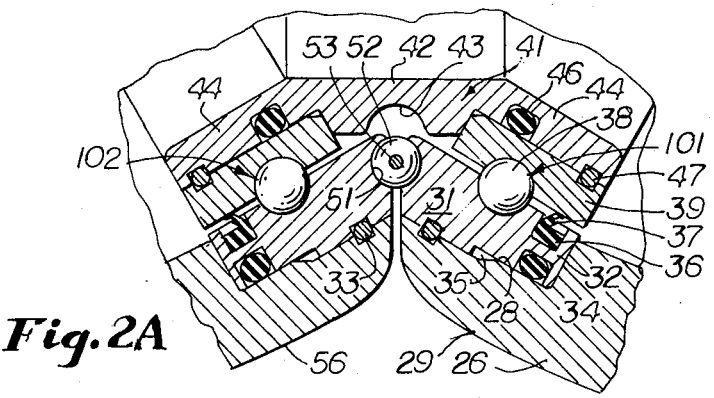
FIG. 2A is a fragmentary enlarged view of a portion of FIG. 2.

FIG. 2 is a vertical midsectional view through the joint of FIG. 1. Sections 22 and 24 comprise truncated spherical shells 26 and 56, respectively, whereas midsection 23 comprises two joined truncated spherical shells 61. The material of construction for the shells is preferably metal or hard plastic. The shells may be, for example, cast and/or machined. Outer surfaces 91 of shells 26 and 56 are spherical. Ends 92-95 of sections 22, 24 are planar and have circular apertures which are large enough to admit the arm of the wearer. Medial section 23 has two outer spherical surfaces 96, 99 with respective centers that are laterally displaced. The ends 97 and 98 of section 23 are planar and each has a bore which is large enough to permit the entry of the wearer's arm. The ends 92, 93 of section 22 have an included angle which is identical to the included angle between ends 94, 95 of section 24, and those two included angles are each one-half the included angle between ends 97 and 98 of section 23.

Directing attention now to details of construction of shell 26 of distal section 22, the outer end has a fitting 27 for connecting the joint to a ball bearing 18 (FIG. 11) on the portion of the space suit which protects the upper arm 16. A recess 28 is formed in proximal end 29 of shell 26 shaped to receive outer bearing race 31 of ball bearing 101. The distal end of race 31 is provided with a flange 32 having grooves therein on its outer and inner surfaces to receive an O-ring 34 which seals the flange 31 to the shell 26 and an inner groove to receive a resilient wiper seal 36 which has a blade 37 sealing against the inner race 39 of ball bearing 101 so that races 31 and 39 may rotate relative to each other by reason of the interposition of balls 38 and yet maintain a hermetic seal. The wiper seal 36 is formed of a plastic material which tightly engages the race 39 yet permits relative movement between the seal 36 and race 39. The outer race 31 is fixed to shell 26 by a flexible cable 33 which fits into matching facing grooves in the two components. This cable may be inserted and removed through appropriate slots 73 (see FIG. 5). A suitable cable inserter/extractor is depicted and described in copending patent application Ser. No. 642,602, field Aug. 20, 1984. It will be seen that there is a clearance 35 between shell 26 and outer race 31.

The end section 24 has a truncated spherical shell 56 similar to shell 26, the proximal end of which has a fitting 57 for coupling to a ball bearing 19 (FIG. 11) on the forearm portion 17 of the suit. Section 24 has a ball bearing 102 which is identical to bearing 101 and which is fastened to the shell in the same manner as bearing 101 is attached to shell 26. The same reference numerals are used to designate corresponding parts.

Figure 6:
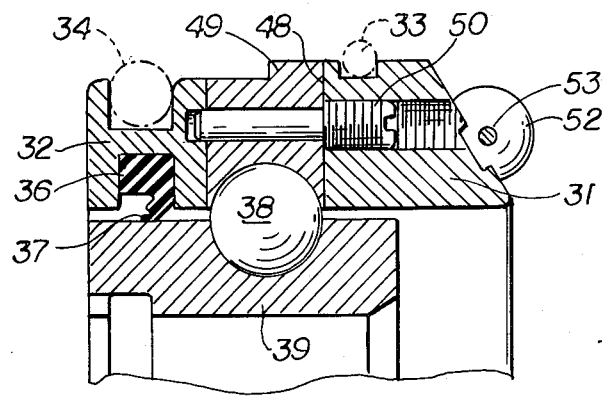
FIG. 6 is a further enlarged sectional view taken substantially along the line 6—6 of FIG. 5.

Balls 38 are received in opposite facing grooves in races 31 and 39 (see FIGS. 2, 2A, 6 and 7). The balls are inserted between the races through a ball insertion port 48 (see FIG. 6). The port is closed off by means of a cap or closure 49 held in place by a screw 50 (FIGS. 5 and 6)

Shell segments 61 of intermediate section 23 are joined together by a cylindrical region. On the inner surface of section 23 this region appears as a cylindrical bore 62. In FIG. 2 it is seen that section 23 tapers and the narrowest portion is at the bottom of the figure. Narrowest portion 41 of section 23 has a center 42 formed with a relief 43 and opposite end sections 44. Ends 44 are secured to inner races 39 by means of seal rings 46 and cables 47 which function similarly to seals 34 and cables 33. These and the cables described below are inserted via slots (not shown) similar to slots 73.

Figure 8:
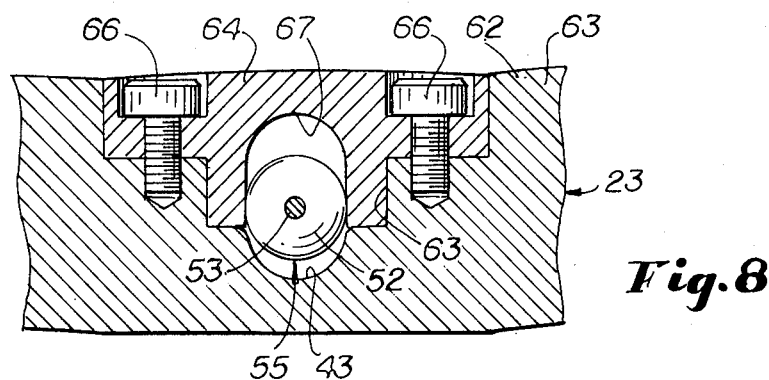
FIG. 8 is a further enlarged view taken substantially along the line 8—8 of FIG. 1.
Figure 9:
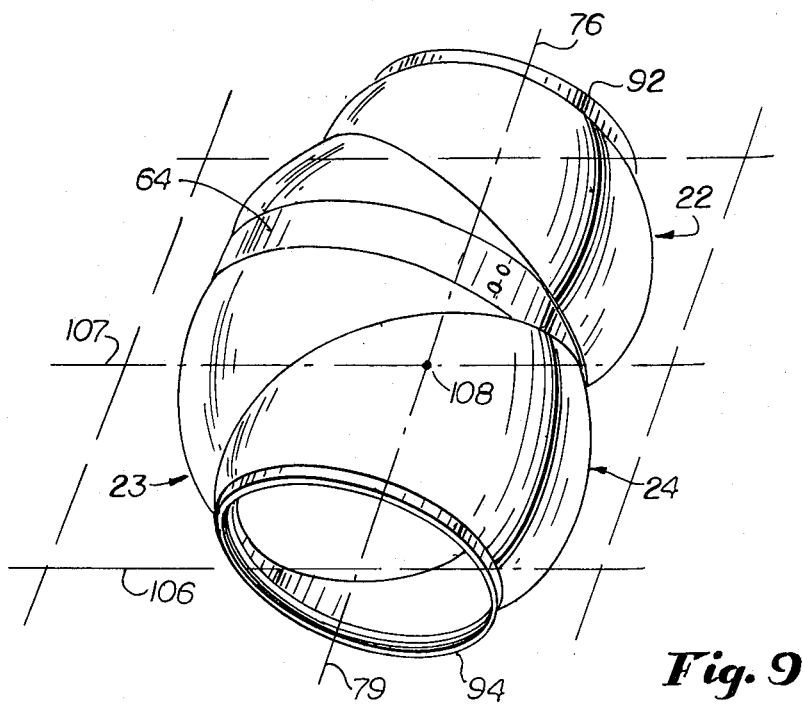
FIG. 9 is a perspective view of a fully extended joint made in accordance with the invention.

Referring to FIG. 8, the cylindrical region of section 23 has an arcuate channel 63 which extends circumferentially around most of the section except for narrowest potion 41. The groove 63 is covered by two identical caps 64 which are held in place by screws 66. The split between the two caps is shown at 71 in FIG. 1. The underside of caps 64 each have a groove 67 that faces a groove 43. A bead chain 55 (the type of chain often used as a key chain) with interconnected balls 52 and links 53 occupies grooves 43 and 67 and has freedom to move therein. Inasmuch as section 23 is truncated in a V-shape manner and bearings 101 and 102 are so close together at the apex of the V, it is necessary to terminate caps 64 in tapers 69 (FIGS. 1 and 9).

Figure 7:
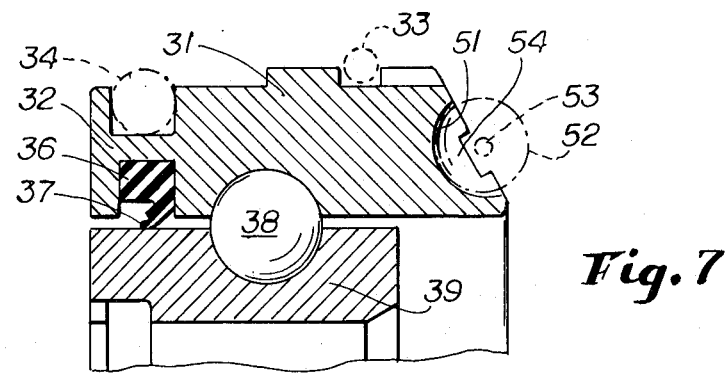
FIG. 7 is a further enlarged sectional view taken substantially along the line 7—7 of FIG. 5.

The facing sides of outer races 31 have hemispherical depressions 51 which receive balls 52 of bead chain 55 for the portion of the outer races which is adjacent narrowest portion 41. As best shown in FIGS. 5 and 7, the depressions 51 are separated by separators 54 which comprise shallow channels in the outer race which interconnect adjacent depressions 51. Because of the chain and the way depressions 51 engage the chain in the vicinity of narrowest portion 41, section 22 tracks section 24 when section 24 is rotated and vice versa.

The ball bearings are assembled in the following manner. After the wiper seal 36 is placed in its channel, the races are brought together and aligned. Balls 38 are loaded through port 48 into the facing grooves of the inner and outer races. When all of the balls are inserted, cap 49 is secured with screw 50. After the ball bearings have been assembled there are numerous ways in which to finish the assembly of the joint. Here, for example, is one way in which to assemble the joint. Encircle bead chain 55 around midsection 23 at groove 43. Position caps 64 over the chain and secure them with screws 66. Insert bearing 101 and O-ring 34 in recess 28 of shell 26 and secure the bearing to the shell with cable 33. Then place ring seal 46 in its channel, join midsection 23 to the inner race 39 and secure the components with cable 47. Next secure ball bearing 102 (and ring seal 34) to shell 56 by means of cable 33. Lastly, slip the bearing end of section 24 over the proximal end of section 23 (with seal 46 in place), making sure the balls 52 coincide with depressions 51, and secure the inner race 39 to section 23 by means of cable 47. The joint may be disassembled for inspection, maintenance or otherwise, by following the steps in reverse order.

Directing attention now to FIG. 2, it will be seen that axis 76 is concentric with upper arm connector 27 and axis 79 in concentric with forearm connector 57. Bearings 101 and 102 have axes of rotation 77 and 78, respectively. Axis 76 intersects axis 77 at point 81 and axis 78 intersects axis 79 at point 82. In FIG. 2 the joint is in its unflexed position permitting the limb of the wearer to be straight. In this extended position, axes 76 and 79 coincide. When the wearer flexes the elbow, the bearings permit the middle section 23 to rotate in a first direction. Simultaneously, end sections 22 and 24 rotate in a second direction opposite to the first direction. The blade 37 of the wiper seal 36 bearing against the inner race 39 has only minimal frictional resistance. Inasmuch as bead chain 55 mates with the depressions 51 in races 31 at portion 41 of middle section 23, sections 22 and 24 move in synchronism. Stated another way, the rotary motion of section 24 tracks the rotary motion of section 22.

Figure 3:
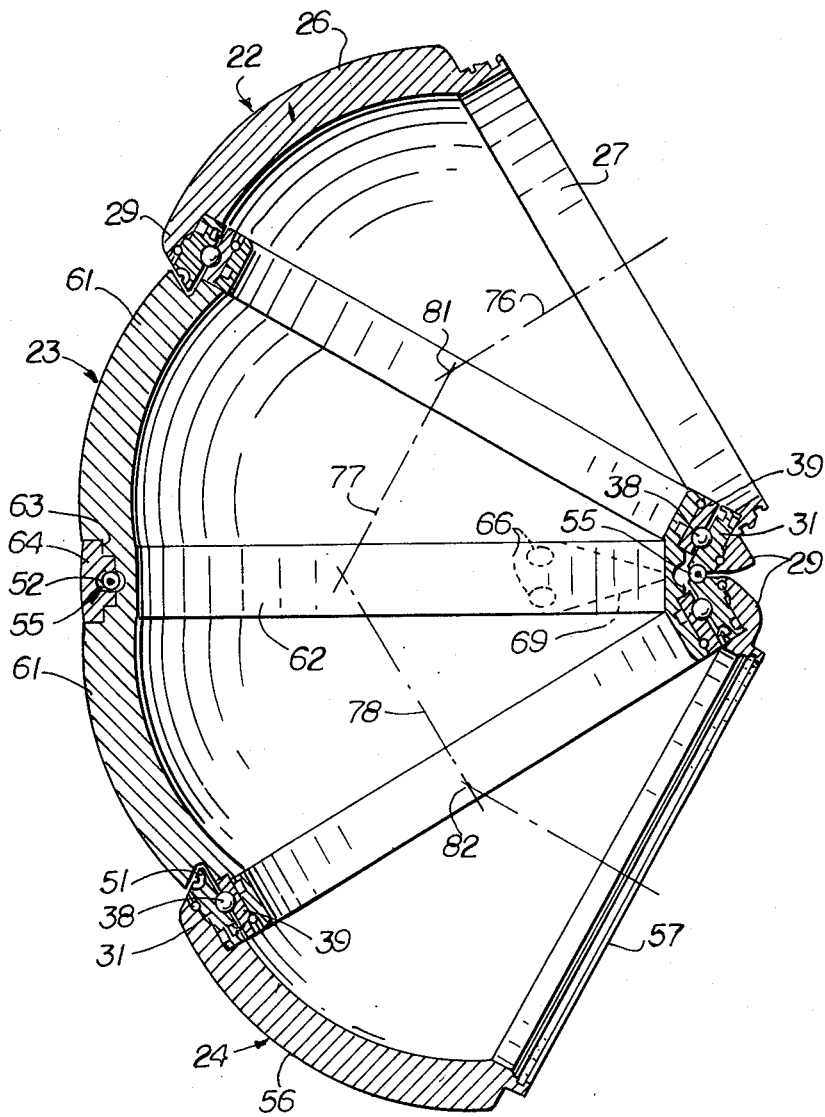
FIG. 3 is a view similar to FIG. 2 showing the joint in its fully flexed position.

FIG. 3 depicts the joint in a flexed position wherein axis 76 and 79 no longer coincide. In FIG. 3, sections 22 and 24 are shown rotated approximately 180° from their positions in FIG. 2. The total angle of flexure which may be achieved by the joint is a function of the included angle between the ends of the sections 22-24. If, for example, the sections 22 and 24 had an included angle of 30 degrees each and the midsection had an included angle of 60 degrees, then the maximum joint flexure would be 120 degrees. If section 22 had an included angle different from the included angle for section 24, the joint would still have the capability of flexure; however, no rotation of the sections could make axis 76 coincide with axis 79.

The human elbow joint is a hinge joint. When the joint is flexed and extended the forearm always remains in one plane. The movement of flexion and extension at the human knee joint differs from that in an elbow joint in that the axis around which the motion takes place is not a fixed one. The axis moves forward during extension and backward during flexion; however, the motion of the limb remains planar.

A feature of the present invention is that fitting axes 76 and 79 always remain in a plane bifurcating the joint for any rotational orientation of the sections. Irrespective of whether connector axes 76 and 79 are coincident or non-coincident, they always remain within a plane dividing the joint in two equal portions. As a result, at any given time the joint has only one pivot point and the limb of the wearer has freedom for natural planar articulation. The joint is not susceptible to lockup. This desirable result is achieved because of the bead chain apparatus that forces the end sections 22 and 24 to move in unison. If the end sections were able to rotate independently of each other, the joint would have two pivot points 81 and 82. The human elbow and the knee do not have double pivot points. If the joint had pivot points 81 and 82, the sections 22-24 could easily cock in such a manner as to place injurious shear forces on the limb of the wearer as the limb attempted to articulate in a natural planar fashion. Stated another way, as the limb of the wearer attempted to flex in a plane, axes 76 and 79 could easily migrate out of a plane and attempt to move the limb in a non-planar manner. This non-planar articulation would induce shear forces on the limb that could be injurious, especially, for example, if the two-point joint was located at the knee of a wearer carrying a heavy back load.

FIG. 9 is a perspective view of a joint made in accordance with the invention wherein connector axes 76 and 79 are coincident. Axes 76 and 79 are on plane 106, a plane which bifurcates the joint. Axis 107 is on the plane 107, is normal to axes 76 and 79 and is located midway between ends 92 and 94. The pivot point of the joint is at the intersection 108 of axis 107 and axes 76, 79.

Figure 10:
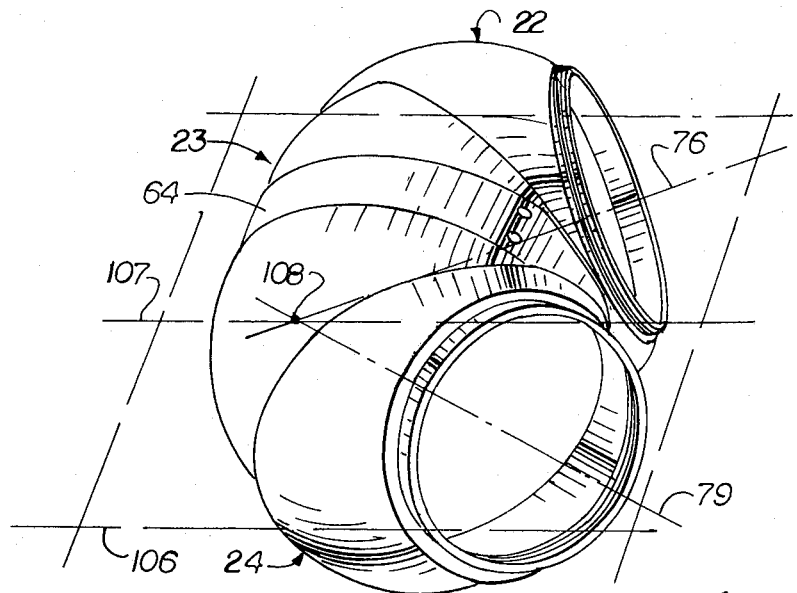
FIG. 10 is a perspective view of the same joint as depicted in FIG. 9; however, in this figure the joint is flexed.

FIG. 10 is a perspective view of the same joint as depicted in FIG. 9; however, in this figure the joint is flexed. Note that fitting axes 76 and 79 still remain in plane 106 even though the joint is articulated. Note further that joint pivot point 108 has moved to a new location on axis 107. Axis 76 and 79 stay on plane 106 for all angles of flexure and they do so because sections 22 and 24 rotate in unison. Thus it is apparent that the joint permits flexion and extension of a wearer's limb in a natural planar manner.

FIG. 11 is a front elevational view of a portion of an arm of a space suit in which the present invention is installed, partially broken away in section. The joint 21 is rotatably coupled to upper arm section 16 by means of a ball bearing 18 whereas the forearm portion 17 is rotatably connected to the joint by means of a ball bearing 19. FIG. 11 illustrates how the walls of the sections 22-24 may be thinned to reduce the weight of the joint or to provide suitable cavities for holding a material or a plurality of materials (a lamination, for example) for shielding purposes. As used herein the term "shielding" encompasses materials that block radiation and/or stop the transfer of heat. The wall thinning may be performed either on the interior or exterior of a section. Section 23 has been thinned on the interior surface whereas sections 22 and 24 have been thinned on the outer surface.

I claim:

1. An articulated joint comprising rigid first, second and third sections serially arranged,
   a first bearing with a central axis, said bearing being secured to adjacent ends of said first and second sections allowing relative rotation of said first and second sections around said axis,
   a second bearing with a central axis, said second bearing being secured to adjacent ends of said second and third sections allowing relative rotation of said second and third sections around said axis of said second bearings, and tying means for causing said first and third sections to rotate together relative to said second section, and in opposite direction to the rotation of the second section when all three sections rotate.

2. A joint according to claim 1 in which some limits of said second section are defined by said first and second bearings, said bearings converge in an angle, and said tying means includes a loop and means for engaging said loop in the region where said first and third sections are nearest to each other.

3. A joint according to claim 2 in which said first and second bearings each has an inner race and an outer race and rotatable elements between said races, said outer races being hermetically sealed to said first and third sections and said inner races being hermetically sealed to said second section and seal means rotatably hermetically sealing said inner and outer races.

4. A joint according to claim 3 in which said seal means comprises a flexible member received in a groove in one said race having a wiping blade engaging the other said race.

5. A joint according to claim 3 in which said outer race is detachable from said first section and in which said outer race and said first section have mating grooves and which further comprises a cable removably positioned in said mating grooves to secure said outer race and said first section together.

6. A joint according to claim 3 in which said inner race is detachable from said third section and in which said inner race and said third section have mating grooves and which further comprises a cable removably positioned in said mating grooves to secure said inner race and said third section together.

7. A joint according to claim 2 in which said first section has a cylindrical end fitting opposite said first bearing, the angle between said end fitting and said first bearing being approximately half the first-mentioned angle between said first and second bearings.

8. A joint according to claim 7 in which said third section has a cylindrical end fitting opposite said second bearing, the angle between the end fitting of said third section and said second bearing being approximately equal to said angle made by said first bearing and said end fitting of said first section whereby said sections may be arranged so that the axes of the two end fittings are coincident.

9. A joint according to claim 8 wherein for any articulation of the joint the axes of said end fittings and of said bearings are all substantially in a common plane bifurcating the joint.

10. A joint according to claim 8 wherein the narrowest part of said second section is juxtaposed with the widest parts of said first and second sections when the end fitting axes are coincident.

11. A joint according to claim 1 in which each said section is substantially a truncated sphere.

12. A joint according to claim 1 in which said tying means comprises a continuous loop formed of a plurality of balls and connecting means for joining said balls in spaced apart relation for linear movement together, said second section being formed with an external circumferential groove within which said balls and connecting means may move, said first and third sections being formed at edges adjoining said second section with spaced sockets shaped to receive said balls, and only a portion of said sockets receiving balls at any given moment.

13. A joint according to claim 12 in which said balls and connecting means form a flexible bead chain.

14. A joint according to claim 12 which further comprises a cap secured to said second sections closing off said groove.

15. A joint according to claim 14 in which said cap tapers where the first and second bearings converge.

16. A joint according to claim 1 which further comprises seal means hermetically sealing said bearings.

17. An articulated joint comprising rigid first, second and third sections serially arranged, first and second bearings, said first and third sections each having a connector end and a bearing-receiving end, said second section having first and second bearing-receiving ends, said first bearing being affixed to said bearing-receiving end of said first section and said first bearing-receiving end of said second section allowing relative rotation between said first section and said second section, said second bearing being affixed to said second bearing-receiving end of said second section and said bearing-receiving end of said third section allowing relative rotation between said second section and said third section, tying means for causing said first and third sections to rotate in synchronism relative to said second section, and said connector ends each having an axis that remains in an imaginary plane bifurcating the joint for any articulation of the joint so that the joint has a single pivot point.

18. A joint according to claim 17 wherein the ends of said first section converge in an angle that is equal to the angle of convergence of the ends of the third section, and the bearings converge in an angle that is twice as large as the equal angles.

19. A joint according to claim 18 wherein said tying means includes a bead chain and means on said first and second sections for engaging said chain in the region where said first and second bearings are nearest to each other.

20. A joint according to claim 19 wherein said first and second bearings each have an inner race and an outer race and rotatable elements between said races, said outer races are hermetically sealed to said first and third sections, said inner races are hermetically sealed to said second section, and a wiping hermetic seal is situated between said inner and outer races.

21. A joint according to claim 20 in which said outer race is detachable from said first section and in which said outer race and said first section have mating grooves and which further comprises a cable removably positioned in said mating grooves to secure said outer race and said first section together.

22. A joint according to claim 21 in which said inner race is detachable from said third section and in which said inner race and said third section have mating grooves and which further comprises a cable removably positioned in said mating grooves to secure said inner race and said third section together.

23. An articulated joint comprising rigid first, second and third sections serially arranged, first and second circular bearings, said first and third sections each having a connector end and an opposite circular end, said second section having first and second opposed circular ends, said first bearing being secured to said circular end of said first section and said first circular end of said second section enabling relative rotation between said first section and said second section, said second bearing being secured to said second circular end of said second section and said circular end of said third section enabling relative rotation between said second section and said third section, tying means for causing said first and third sections to rotate in unison relative to said second section, and in opposite direction to the rotation of the second section when all three sections rotate, said connector ends each having an axis that remains in an imaginary plane bifurcating the joint for any articulation of the joint so that the joint has a single pivot point.

24. A joint according to claim 23 wherein the ends of said first section coverge in an angle that is equal to the angle of convergence of the ends of the third section, and the bearings converge in an angle that is twice as large as the equal angles.

25. A joint according to claim 24 wherein said tying means includes a bead chain and means on said first and second sections for engaging said chain in the region where said first and second bearings are nearest to each other.

26. A joint according to claim 25 wherein said first and second bearings each have an inner race and an outer race and rotatable elements between said races, said outer races are hermetically sealed to said first and third sections, said inner races are hermetically sealed to said second section, and a wiping hermetic seal is situated between said inner and outer races.

27. A joint according to claim 26 in which said outer race is detachable from said first section and in which said outer race and said first section have mating grooves and which further comprises a cable removably positioned in said mating grooves to secure said outer race and said first section together.

28. A joint according to claim 27 in which said inner race is detchable from said third section and in which said inner race and said third section have mating grooves and which further comprises a cable removably positioned in said mating grooves to secure said inner race and said third section together.

29. A joint according to claim 23 in which each of said sections is substantially a truncated sphere.

* * * * *